(12) United States Patent
Gormley

(10) Patent No.: US 9,869,275 B2
(45) Date of Patent: Jan. 16, 2018

(54) SINGLE ACTUATOR VARIABLE AREA FAN NOZZLE SYSTEM AND METHOD

(71) Applicant: ROHR, INC., Chula Vista, CA (US)

(72) Inventor: Timothy Gormley, Bonita, CA (US)

(73) Assignee: ROHR, INC., Chula Vista, CA (US)

(*) Notice: Subject to any disclaimer, the term of this patent is extended or adjusted under 35 U.S.C. 154(b) by 731 days.

(21) Appl. No.: 14/261,207

(22) Filed: Apr. 24, 2014

(65) Prior Publication Data

US 2015/0308374 A1    Oct. 29, 2015

(51) Int. Cl.
  *F02K 1/09* (2006.01)
  *F02K 1/76* (2006.01)
  *F02K 1/72* (2006.01)

(52) U.S. Cl.
  CPC .............. *F02K 1/09* (2013.01); *F02K 1/763* (2013.01); *F02K 1/72* (2013.01); *F05D 2250/34* (2013.01); *F05D 2260/57* (2013.01)

(58) Field of Classification Search
  CPC ..... F02K 1/09; F02K 1/15; F02K 1/72; F02K 1/763; F05D 2250/34; F05D 2260/57; F05D 2270/60; F05D 2270/62; F05D 2270/64; F05D 2270/66

See application file for complete search history.

(56) References Cited

U.S. PATENT DOCUMENTS

| 2010/0229528 A1* | 9/2010 | Ramlaoui | F02K 1/09 60/226.2 |
| 2011/0277448 A1* | 11/2011 | Roberts | B64D 29/06 60/226.2 |
| 2013/0008147 A1* | 1/2013 | Todorovic | F02K 1/085 60/226.3 |
| 2015/0000305 A1* | 1/2015 | Jasklowski | F02K 1/1207 60/796 |

* cited by examiner

*Primary Examiner* — Gerald L Sung
*Assistant Examiner* — Marc Amar
(74) *Attorney, Agent, or Firm* — Snell & Wilmer, L.L.P.

(57) ABSTRACT

A single actuator variable area fan nozzle ("VAFN") system is provided. In contrast to typical system, the single actuator VAFN may comprise a single actuator, a linkage and a VAFN panel. The single actuator may be configured to actuate the VAFN panel between a stowed position and a deployed position. In various embodiments, the linkage may travel a path during deployment and/or retraction that is between the loft lines of the nacelle.

11 Claims, 4 Drawing Sheets

SINGLE ACTUATOR VARIABLE AREA FAN NOZZLE SYSTEM AND METHOD

FIELD

The present disclosure relates to a variable area fan nozzle ("VAFN"), and more specifically, to a single actuator VAFN system and apparatus.

BACKGROUND

Typical translating VAFNs are actuated using multiple separate actuators. A first actuator may be located near the hinge beam (e.g., the upper track beam) and a second actuator may be located near the latch beam (e.g., the lower track beam), for example. Each of the actuators may be coupled to a VAFN panel and may be configured to actuate the VAFN panel forward and aft, to deploy and stow it. In this two actuator arrangement, the actuators are typically synchronized very closely to prevent the VAFN from binding or jamming within its tracks. Synchronization is typically achieved via heavy flexible shafts and complex mechanisms and requires constant position feedback.

SUMMARY

In various embodiments, a VAFN may comprise a single actuator, an actuation linkage and a VAFN panel. The actuation linkage may be coupled to the single actuator. The VAFN panel may be coupled to the actuation linkage. The VAFN panel configured to translate forward and aft based on inputs from the single actuator.

In various embodiments, a nacelle used on a turbofan engine may comprise a first hemisphere. The first hemisphere may comprise a fan cowl, a translating sleeve, a VAFN panel, a linkage assembly and a single actuator. The fan cowl may be configured to surround a fan and define a portion of a bypass duct. The translating sleeve may be disposed aft the fan cowl. The translating sleeve may be configured to translate forward and aft. The VAFN panel may be disposed aft the translating sleeve. The VAFN panel may be configured to adjust the exhaust area of the bypass duct. The linkage assembly may be operatively coupled to the VAFN panel. The single actuator may be coupled to the linkage assembly. The single actuator may be configured to deploy the VAFN panel via the linkage assembly.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

In various embodiments, a VAFN may be configured to adjust the nozzle cross-section of the bypass duct by translating forward and aft (e.g., to stow and deploy), in a known manner. In this regard, the VAFN may be configured to adjust flow from the fan through the bypass duct by controlling the exhaust area of the bypass duct.

As already described, a typical VAFN actuation system comprises multiple actuators to stow and deploy the VAFN. The typical VAFN would also include synchronization mechanisms to synchronize the movement of the multiple actuators to prevent binding and jamming, sometimes comprising heavy flexible synchronization shafts. This disclosure proposes eliminating the multiple VAFN actuators and using a single actuator, which generally eliminates synchronization problems (e.g., "skew") between the multiple VAFN drive system actuators.

Figure 1:
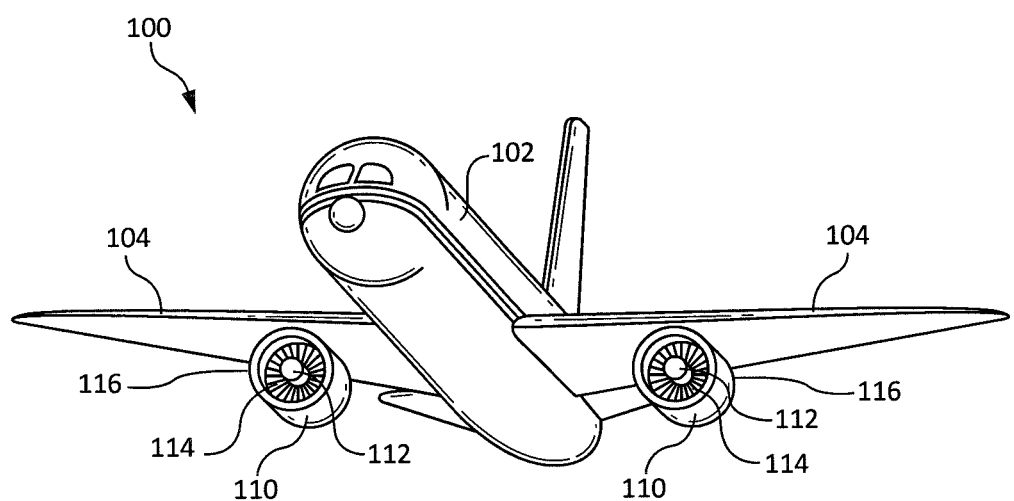
FIG. 1 illustrates a perspective view of an aircraft, in accordance with various embodiments.

In various embodiments and with reference to FIG. 1, an aircraft 100 may comprise a fuselage 102 and a pair of wings 104. Propulsion system 110 (e.g., a turbofan jet engine with a nacelle assembly) may be mounted on the underside of wing 104. Propulsion system 110 may be configured to provide forward thrust and/or propulsion for aircraft 100.

In various embodiments, propulsion system 110 may comprise an engine including an engine core 112 and a fan 114, a pylon, and a nacelle 116 (e.g., a nacelle assembly and/or a nacelle package). Nacelle 116 may include two hemispheres (e.g., a first hemisphere or right hemisphere and a second hemisphere or left hemisphere). The two hemispheres may be joined together to surround engine core 112 and fan 114.

Figure 2A:
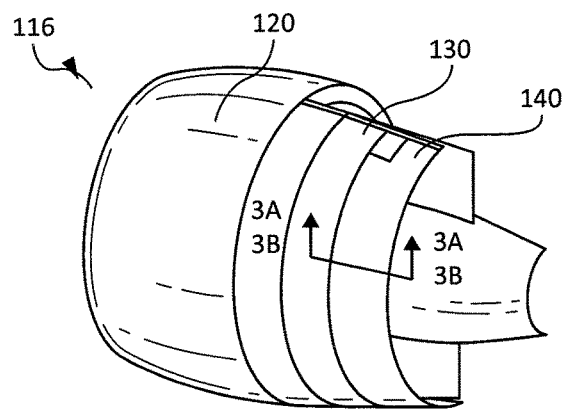
FIG. 2A illustrates a perspective view of a portion of the nacelle, in accordance with various embodiments.

In various embodiments and with reference to FIGS. 1 and 2A, each hemisphere of nacelle 116 may comprise a fan cowl 120, a translating sleeve 130 which forms part of a translating sleeve thrust reverser system and moves between a stowed and deployed position in a known manner, and a VAFN panel 140 mounted on or otherwise forming part of the translating sleeve 130. Fan cowl 120 may be configured to surround fan 114 and define a portion of the outer surface of the Nacelle. The translating sleeve 130 may be capable of being actuated forward and aft in response to activation of the thrust reverser system during a landing event. In this regard, translating sleeve 130 may be configured to actuate from its stowed position aft to a deployed position to expose a thrust reverser system components (e.g., a cascade array) when the thrust reverser system is activated.

In various embodiments, fan 114 may draw and direct a flow of air into and through propulsion system 110. Aft of the fan 114, the air is divided into two principal flow paths, one flow path through engine core 112, and another flow path through a bypass air duct. The engine core flow path is directed into engine core 112 and initially passes through a compressor that increases the air flow pressure, and then through a combustor where the air is mixed with fuel and ignited. The combustion of the fuel and air mixture causes a series of turbine blades at the rear of engine core 112 to rotate, and to drive the engine's rotor and fan.

The bypass air may exit the bypass air duct at the aft end of the nacelle for thrust. In turbofan engines, the bypass flow typically provides a large percentage of the thrust for an aircraft. Moreover, the exhaust area of the bypass duct is generally sized for cruise conditions to provide the maximum operating efficiency. In this regard, the longest portion of the duty cycle of propulsion system 110 is likely cruise in most operating scenarios. However, a VAFN system may increase the overall efficiency of the aircraft by creating an adjustable bypass duct exhaust nozzle area to increase the operating efficiency or operating margin or stability of propulsion system 110 in non-cruise operating scenarios (e.g., take-off, climb, and descent).

In various embodiments, VAFN panel 140 may be installed as a portion of translating sleeve 130. In this regard, VAFN panel 140 may be installed aft of and proximate to translating sleeve 130. VAFN panel 140 may be configured to actuate aft to adjust, enlarge, control and/or otherwise modify the exhaust nozzle area of the bypass duct.

Figure 2B:
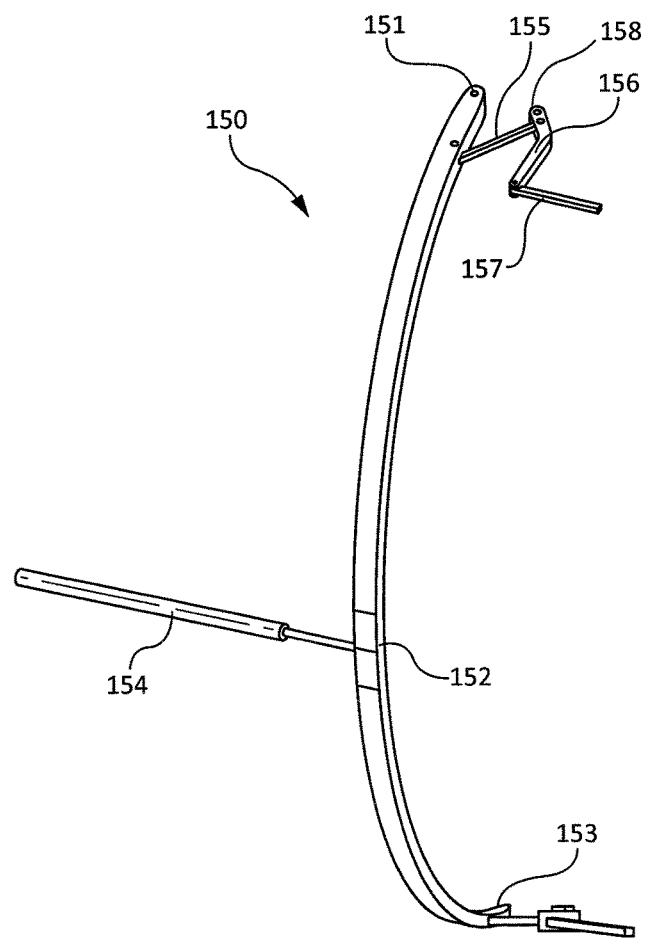
FIG. 2B illustrates a perspective view of a single actuator VAFN actuation system, in accordance with various embodiments.
Figure 2C:
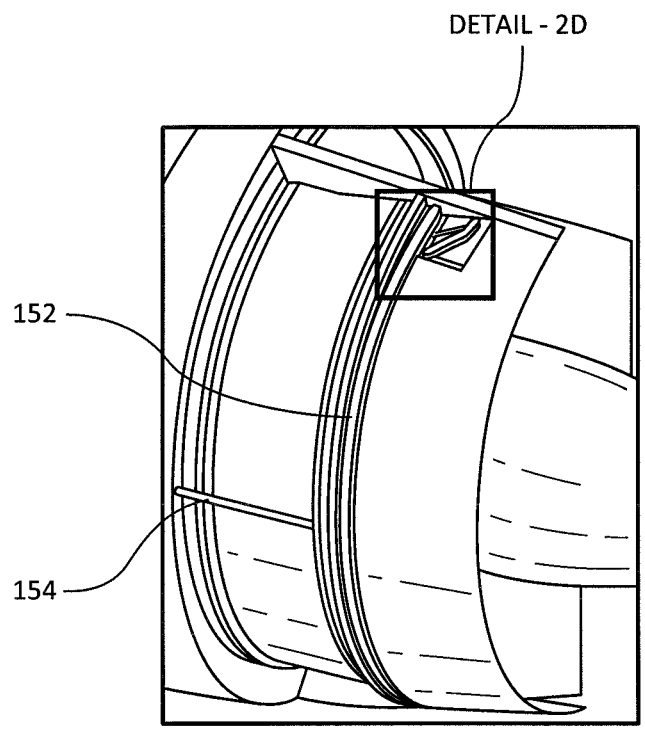
FIG. 2C illustrates a perspective view of a portion of the nacelle including a single actuator VAFN actuation system, in accordance with various embodiments.
Figure 2D:
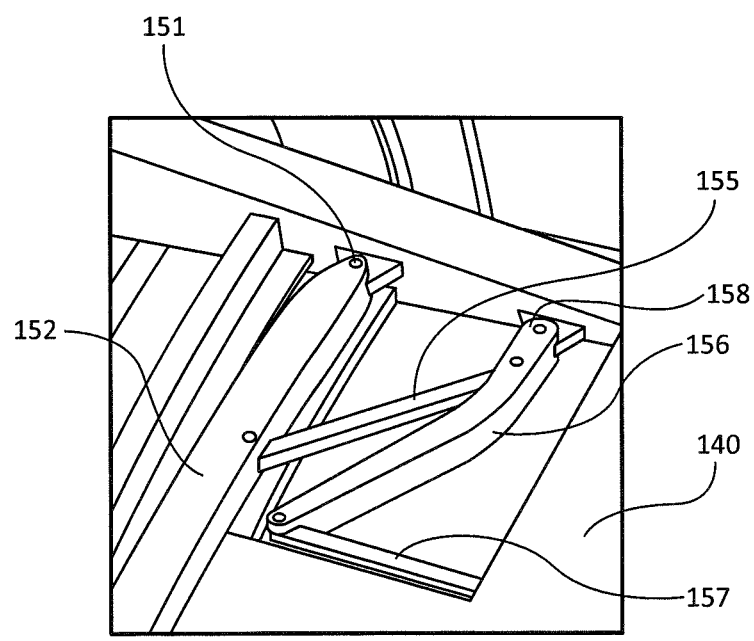
FIG. 2D illustrates a perspective detail view of a portion of the nacelle including a linkage of a single actuator VAFN actuation system, in accordance with various embodiments.

In various embodiments and with reference to FIG. 2B, the VAFN panel may be actuated by a single actuator VAFN mechanism 150. Single actuator VAFN mechanism 150 may be configured to actuate VAFN panel 140 forward and aft to control, modify, or change the exhaust nozzle area of the bypass duct.

In various embodiments, single actuator VAFN mechanism 150 may comprise a single actuator 154 and an actuation linkage. The actuation linkage may be configured to conduct motion from single actuator 154 to VAFN panel 140. For example, the actuation linkage mechanism may comprise a ring crank 152, a slave pushrod 155, a main crank 156 and a VAFN pushrod 157. Slave pushrod 155 may comprise a first end and a second end. Slave pushrod 155 may rotatably couple to ring crank 152 at a first end and main crank 156 at a second end. Main crank 156 may be pivotally coupled to the nacelle structure at pivot 158 Main crank 156 may be pivotally attached to a portion of the translating sleeve such that main crank 156 may translate with said translating sleeve. Main crank 156 may also be rotatably coupled to VAFN pushrod 157. VAFN pushrod 157 may be flexibly coupled at its aft distal end to the VAFN panel via pivot 158.

In various embodiments, ring crank 152 may be a partial hoop structure. This hoop structure may extend along a portion of a diameter of a hemisphere of nacelle 116. Ring crank 152 may comprise first end (e.g., upper pivot 151) and second end (lower pivot 153) that may be configured to rotatably attach to the nacelle structure. Like main crank 156, ring crank 152 may also be pivotally attached to a portion of the translating sleeve at each distal end of the upper pivot 151 and lower pivot 153, respectively, such that ring crank 152 may translate with the translating sleeve but also pivot with respect thereto. In this regard, in response to ring crank 152 being actuated by actuator 154, ring crank 152 may be configured to travel along an arced path about upper pivot 151 and lower pivot 153. This configuration may allow ring crank 152 to travel within the loft line of the nacelle. In this regard, ring crank 152 and the path traveled by ring crank 152 may not modify the loft line of the nacelle. More specifically, the sweep and/or path travelled by ring crank 152 in response to actuation of actuator 154 may not affect the aerodynamic profile of nacelle 116.

In various embodiments and with reference to FIGS. 2A-2D, single actuator VAFN mechanism 150 may be installed between translating sleeve 130 and VAFN panel 140. Actuator 154 may travel across a portion of the thrust reverser system between, for example, translating sleeve 130 and a cascade. In this regard, actuator 154 may be installed under, behind, and/or radially inward of translating sleeve 130.

In various embodiments and in operation and in response to activation of the VAFN system, actuator 154 may extend and actuate ring crank 152, driving and/or translating ring crank 152 aft (e.g., ring crank 152 may translate from a stowed position to a deployed position). The motion of ring crank 152 may cause slave pushrod 155 to push on main crank 156, causing main crank 156 to pivot about a pivot point 158. Moreover, the pivoting or translating of main crank 156 may cause VAFN push rod 157 to push VAFN panel 140 aft (e.g., toward a deployed position). In this regard, as actuator 154 extends and/or pushes on ring crank 152, VAFN panel 140 may move aft. In response to actuator 154 contracting and/or pulling on ring crank 152, VAFN panel 140 may be configured to move forward (e.g., toward a stowed position).

In various embodiments, single actuator VAFN mechanism 150 and/or VAFN panel 140 may be monitored by a controller and/or other suitable monitoring device. In this regard the position of actuator 154, ring crank 152, VAFN push rod 157 and/or VAFN panel 140 may be monitored to control the exhaust area of the bypass duct. In this regard, VAFN panel 140 may be modulated, moved and/or adjusted to control and/or modify the exhaust area of the bypass duct to improve the flow characteristics of the fan and increase efficiency of the engine.

In various embodiments, actuator 154 may be any suitable actuator including, for example, an electric motor actuator and/or a hydraulic actuator. Moreover, actuator 154 may be a hydraulic actuation system. Actuator 154 may include sufficient stroke to accommodate the deployment of the thrust reverser. Actuator 154 may also include a disconnect device for use during thrust reverser deployment.

Figure 3A:
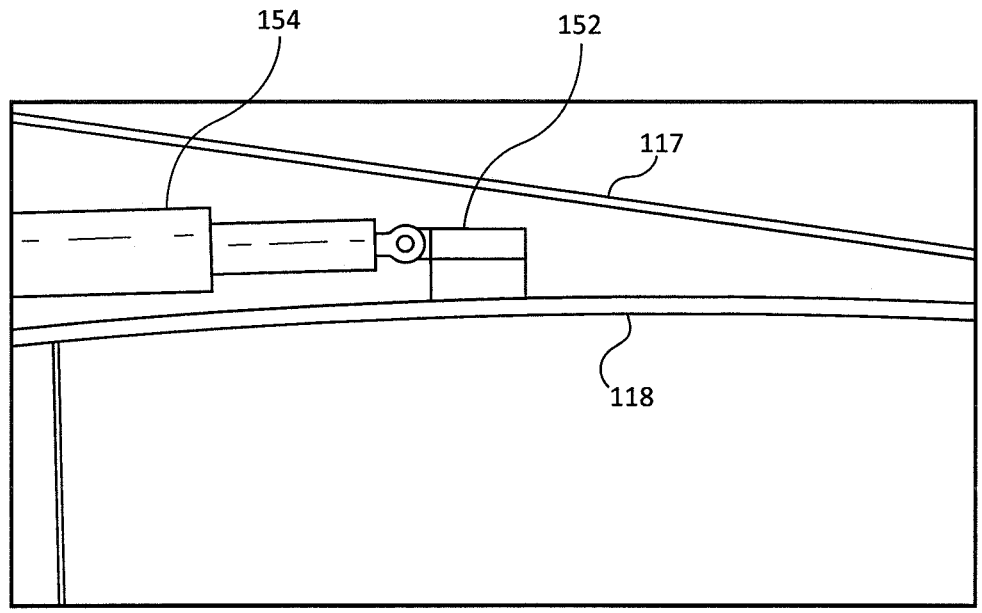
FIG. 3A illustrates a partial cross-sectional view of a portion of the nacelle including a single actuator VAFN actuation system in a first position, in accordance with various embodiments.
Figure 3B:
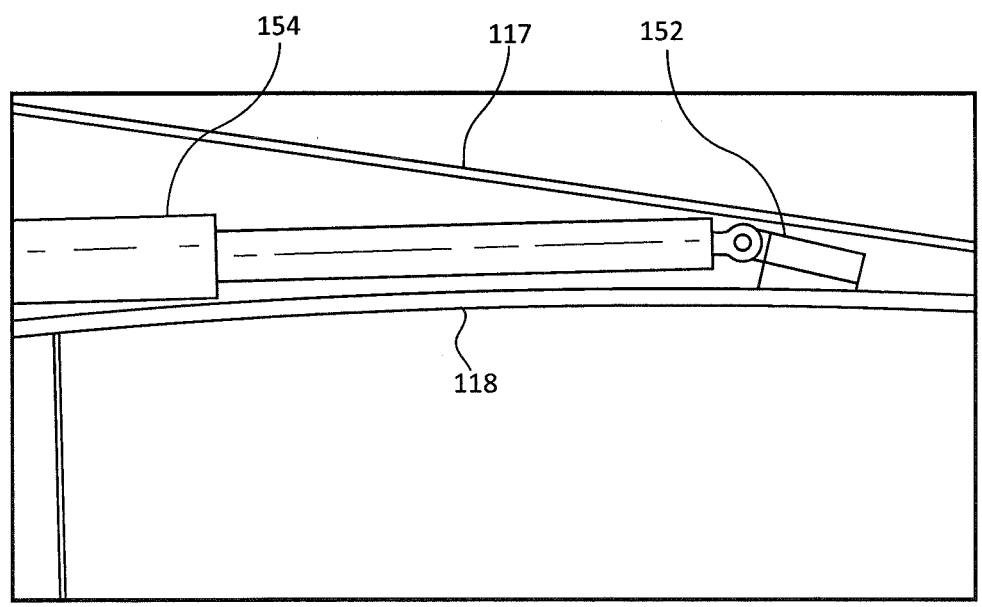
FIG. 3B illustrates a partial cross-sectional view of a portion of the nacelle including a single actuator VAFN actuation system in a second position, in accordance with various embodiments.

In various embodiments and with reference to FIGS. 3A-3B, the path of ring crank 152 may be controlled and/or may be defined within the loft line of nacelle 116. For example, the path and/or sweep of ring crank 152 when actuated and/or translated (e.g., between the stowed position as shown in FIG. 3A and the deployed position as shown in FIG. 3B) by actuator 154 may stay within a channel defined by an outer surface 117 (e.g., the outer mold line) and an inner surface 118 (e.g., the outer surface of the bypass duct) of a portion of nacelle 116 (e.g., translating sleeve 130, VAFN panel 140, and/or the like).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A variable area fan nozzle ("VAFN"), comprising:
a single actuator;
an actuation linkage coupled to the single actuator, comprising:
a ring crank having a first end and a second end; and
a VAFN panel coupled to the actuation linkage and configured to translate forward and aft based on inputs from the single actuator to change a nozzle area of a fan duct,
wherein the first end is configured to be pivotally mounted to a translating sleeve and wherein the second end is configured to be pivotally mounted to the translating sleeve, and
the pivoting of the ring crank causes the VAFN panel to translate at least one of forward and aft.

2. The VAFN of claim 1, wherein the ring crank is a partial hoop structure.

3. The VAFN of claim 1, wherein the ring crank is configured to pivot from a stowed position to a deployed position within a loft line of the nacelle, the loft line of the nacelle is defined between an outer surface of the nacelle and an inner surface of the nacelle.

4. The VAFN of claim 1, further comprising:
a slave pushrod operatively coupled to the ring crank;
a main crank coupled to the slave pushrod, the main crank configured to pivot between a first position and a second position in response to movement of the ring crank; and
a VAFN pushrod coupled to the main crank and the VAFN panel.

5. The VAFN of claim 1, wherein the single actuator is at least one of an electric actuator and a hydraulic actuator.

6. The VAFN of claim 1, wherein the VAFN is a portion of the nacelle and is installed in the nacelle aft the translating sleeve.

7. A nacelle, comprising:
a first hemisphere comprising:
a fan cowl;
a translating sleeve disposed aft the fan cowl and configured to translate forward and aft;
a variable area fan nozzle ("VAFN") panel disposed aft the translating sleeve and configured to adjust an exhaust nozzle area of a bypass duct;
a linkage assembly operatively coupled to the VAFN panel; and
a single actuator coupled to the linkage assembly and configured to deploy the VAFN panel via the linkage assembly,
wherein the linkage assembly comprises a ring crank having a first end pivotally mounted to the translating sleeve and a second end pivotally mounted to the translating sleeve
wherein pivoting of the ring crank causes the VAFN panel to translate at least one of forward and aft.

8. The nacelle of claim 7, wherein the ring crank is configured to translate between a first position and a second position within a loft line of the nacelle, the loft line of the nacelle is defined between an outer surface of the nacelle and an inner surface of the nacelle.

9. The nacelle of claim 7, wherein the single actuator is configured to engage the linkage assembly at a mid-point of the ring crank.

10. The nacelle of claim 8, wherein the linkage assembly is configured to pivot in response to the ring crank translating between the first position and the second position.

11. The nacelle of claim 7, wherein the single actuator is disposed under the translating sleeve.

* * * * *

UNITED STATES PATENT AND TRADEMARK OFFICE
CERTIFICATE OF CORRECTION

PATENT NO. : 9,869,275 B2
APPLICATION NO. : 14/261207
DATED : January 16, 2018
INVENTOR(S) : Timothy Gormley Page 1 of 1

It is certified that error appears in the above-identified patent and that said Letters Patent is hereby corrected as shown below:

In the Claims

In Column 6, Line 15 delete "a second end;" and insert therefore -- a second end; a slave pushrod operatively coupled to the ring crank, the slave pushrod driven by the ring crank; and a main crank operatively coupled to the slave pushrod, the main crank configured to pivot between a first position and a second position in response to movement of the ring crank driving the slave pushrod; --
In Column 6, Line 21 delete "translating sleeve" and insert therefore -- nacelle --
In Column 6, Line 22 delete "translating sleeve" and insert therefore -- nacelle --
In Column 6, Line 24 delete "ring crank" and insert therefore -- ring crank causes the pivoting of the main crank that --
In Column 6, Line 34 delete "a slave pushrod operatively coupled to the ring crank; a main crank coupled to the slave pushrod, the main crank configured to pivot between a first position and a second position in response to movement of the ring crank; and"
In Column 6, Line 55 delete "panel;" and insert therefore -- panel, comprising: a ring crank having a first end pivotally mounted to the nacelle and a second end pivotally mounted to the nacelle; a slave pushrod operatively coupled to the ring crank, the slave pushrod is driven by the ring crank; and a main crank operatively coupled to the slave pushrod, the main crank configured to pivot between a first position and a second position in response to movement of the ring crank; --
In Column 6, Line 56 delete "single actuator" and insert therefore -- single actuator operatively --
In Column 6, Line 56 delete "linkage assembly" and insert therefore -- ring crank --
In Column 6, Line 59 delete "wherein the linkage assembly comprises a ring crank having a first end pivotally mounted to the translating sleeve and a second end pivotally mounted to the translating sleeve"
Column 7, Lines 6-10, delete Claims 10 and 11 and substitute with the following Claims 10 and 11:
10. The nacelle of claim 7, wherein the single actuator is disposed under the translating sleeve.
11. The nacelle of claim 7, wherein the linkage assembly further comprises a VAFN pushrod coupled to the main crank and the VAFN panel.

Signed and Sealed this
Thirteenth Day of November, 2018

Andrei Iancu
*Director of the United States Patent and Trademark Office*